United States Patent Office 3,594,166
Patented July 20, 1971

3,594,166
PROCESS FOR PRODUCING COPIES BY IMAGE-WISE HEATING
Alexander Riebel, Leverkusen, and Wolfgang Lassig, Karl Dinges, and Wolfgang Himmelmann, Cologne, Stammheim, Germany, assignors to Agfa-Gevaert Aktiengesellschaft, Leverkusen, Germany
No Drawing. Filed Dec. 21, 1965, Ser. No. 515,456
Claims priority, application Germany, Jan. 8, 1965, A 48,075
Int. Cl. G03c 5/04, 11/12, 5/24
U.S. Cl. 96—27                                6 Claims

ABSTRACT OF THE DISCLOSURE

Thermographic copies are made with material, insensitive to daylight, having a support to which is adhered a copying layer of a swellable binder which can be hardened to reduce this swellability. Dispersed in the binder is a hardener that effects such hardening when heated to 50–300° C. and the binder is colored so that it absorbs light and converts the light energy to heat energy. When exposed to an original image with a high intensity flash of at least 300 watt-seconds, the exposed portions of the binder become hardened leaving the other portions swellable. A swelling liquid is then applied and the copying layer placed against a receiving sheet. The swelled unexposed portions of the copying layer adhere to the receiving sheet and when the receiving sheet is pulled away from the copying layer, a relief image of the original is torn out of the copying layer and appears on the receiving sheet. At the same time a relief image of opposite sense remains on the copying layer.

The invention relates to a photographic process of making copies of originals by image-wise heating copying layers, the physical properties of which are modified at the heated areas.

Many heat copying processes are known, in which a colored image is formed. For example, when an original having a visible pattern which absorbs infra-red light is placed in contact with a thermo-sensitive sheet and subjected to infra-red rays, the areas of the sheet adjacent the absorbing pattern of the original are heated to form a visible image thereon. However, these processes have the disadvantage that they are unsuitable for the reproduction of colored originals in which the colors do not absorb infra-red radiation.

There have accordingly been developed copying processes and materials based on heat-sensitive chemical color-forming reactions with light energy of the visible spectrum, to obviate this disadvantage. These reactions require an illumination source of extremely high radiation intensity and relatively short exposure time, such as the so-called electronic flash tubes.

Furthermore, it is known to use a thermo-sensitive layer which contains a dye capable of absorbing light of the visible range of the spectrum and which converts the said light to heat energy, in combination with a heat-sensitive organic compound which is decomposed upon heating to form gas bubbles at the heated areas, whereby in the areas exposed to the light the sensitive layer is optically changed in such a manner that the color disappears and a positive image of the original is obtained.

It is among the objects of the present invention to provide a novel photographic process which enables a copy in the form of a relief image to be produced by exposure to transparent originals or by reflex exposure.

We now have found that in a heat-sensitive layer containing a dye capable of absorbing light of the visible range of the spectrum and converting the said light to heat energy, chemical reactions can occur at exposed and thus heated areas to alter other physical properties of the layer, for example, the solubility, the swellability or the adhesiveness inherent in the layer surface.

For example, it has been proposed to impart a certain natural absorption to copying layers by incorporation of a dark pigment, so that they are heated under the action of an electronic flash illumination. By simultaneously incorporating a heat-sensitive organic compound which decomposes to form gas, a copying material is obtained which always blows small gas bubbles at the areas affected by the light and thus brightens these areas. This permits a positive copy to be produced from transparent positive originals by flash illumination.

Thus, a differentiation is produced in the binding agent that forms the copying layer, such differentiation corresponding to the characters of the original. The alteration of the physical properties of the layer does not have to be accompanied by a visible change in the heated layer portions. It is sufficient if there is a hardening or cross-linking of the exposed layer portions, caused by the exposure and the heating thereby produced in the layer, so that an image-wise differentiation and the production of copies become possible.

The copying material used is essentially a copying layer arranged on a support. The composition is for example as follows:

(1) Support

For the support, sheet-like transparent or non-transparent materials are suitable, depending on the reproduction method for which the copying material is to be used. Ordinary paper supports are particularly useful. If the material is to be processed by a reflex copying method, as for example described in Belgian Pat. 657,502, the support must be transparent. The term "transparent" relates in this case to the copying light to be used, which light consists essentially of light of wavelengths between $0.3\mu$ and $1\mu$.

The support can consist of the usual film-forming materials, such as cellulose esters more especially cellulose acetates, polyvinyl chloride, polycarbonates more especially of bis-hydroxyphenyl alkanes, polyesters advantageously polyethylene terephthalates, and similar polymer products. Transparent papers of usual composition and origin are preferred.

(2) Copying layer

The copying layer contains pigments or dyes which are able to absorb the copying light and which convert the absorbed rays into heat energy. The pigments or dyes can be distributed either heterogeneously or homogeneously in the copying layer.

It is possible to use inorganic pigments, such as carbon black, graphite, oxides or sulfides of heavy metals, more especially those heavy metals which have an atomic weight approximately between 45 and 210, for example, manganese oxide or lead sulfide. Particular utility is exhibited by finely distributed metals, for example, silver, bismuth, lead, iron, cobalt or nickel.

The copying layer can also be dyed by means of organic dyes, for example, by azo dyes, formazane dyes, cyanine dyes, triphenyl methane or diphenyl methane dyes or indigoid dyes. It is preferred to use those dyes which mainly absorb in the red and/or green region of the spectrum.

The copying layer can contain between 0.01 and 1% by weight preferably between 0.1 and 0.5% by weight of pigment, or dyes based on the total weight of the layer. Pigments which are black or deeply colored are preferred. The optical density of the copying layer should be between 0.25 and 0.78, especially for reflex copying processes. The binding agent for the copying layer in principle can be any film-forming product which can be cross-linked or hardened under the action of heat within short periods of time up to about 5 seconds, and advantageously from about $\frac{1}{3000}$ to $\frac{1}{100}$ second at temperatures of about 50–300° C. It is also possible for the heat sensitivity of the binders to be initiated or intensified by certain additives. Particularly suitable for the process of the invention are, for example, gelatin, alone or in combination with compounds capable of hardening it under heat, such as polyacrolein bisulfite, cinnamaldehyde, glyoxalacetals, trioxymethylene or azopyrazolones which are described in German patent application A 47,553 IXa/57b, a certified copy of which was included in a counterpart U.S. patent application Ser. No. 504,144 filed Oct. 23, 1965. Furthermore, polymers or copolymers which contain, in polymerized form, units of N-methylol ethers or esters of acrylic acid or methacrylic acid amides are suitable. The N-methylol ether or ester units should preferably be present in amounts of between 10–100 mol percent. The polymer can further contain up to 90 mol percent units of acrylic or methacrylic acid, amides of the above acids, acrylonitrile, esters of the above acids and the like. Polyacrolein acetals in particular acetals of lower aliphatic aldehydes having up to 5 carbon atoms, such as polyacrolein diethylacetal, have proved to be especially suitable. The heat-sensitive binding agent can be used in admixture with colloids which per se are not heat-sensitive. The proportions by weight of these binder components in the layer is in principle not critical and should be so adjusted that an adequate sensitivity and cross-linking is guaranteed. The addition of such binders which per se are inert is advisable in many cases, since the pigments, for example, colloidally distributed silver, can in fact only be produced in sufficiently finely divided form in the presence of certain protective colloids, such as polyvinyl alcohol or polyvinyl pyrrolidone. The process of the invention is generally described in the following:

After image-wise exposure and heating of the copying layer at the light-struck areas, these portions of the layer become insoluble, non-swellable or, with previously tacky layers, they become non-tacky due to the cross-linking and depending on the properties of the layer. If now the exposed copying material is moistened with a suitable solvent or swelling agent, those areas of the layer which are not exposed to light and have consequently remained unchanged are dissolved or softened and thus made capable of transfer. If the thus-treated layers are contacted with a reception material in sheet form, the unexposed and softened or swollen portions of the copying layer can be transferred wholly or partly to the reception sheet. In this way a positive relief image of the original is obtained, which consists of the binding agent containing the pigment. It is thus possible to perform the transfer step in such a way that several prints from one copying sheet are obtained.

If the copying layer is placed into contact with the original during the exposure, the positive copy which is formed is non-laterally reversed with respect to the original.

The process according to the invention is also suitable for the production of copies by the reflex copying process. In this case the heat-sensitive binding agent must be so selected as regards their cross-linking temperatures that the heating which occurs with the absorption of the light rays to which it is exposed does not cause any changes in the physical properties. It is only the sum of this heating with the heating resulting from the absorption of light reflected from the reflected background of the image being reflexed, which must cause the cross-linking.

The positive relief image obtained after the transfer to a reception sheet can also be used as a printing plate.

Thus, the characters of the unexposed portions of the copying layer can also be transferred to metal supports, for example, to aluminum foils, which are then suitable as offset printing plates. The negative relief image formed from the original copying layer, which image may be laterally reversed or non-laterally reversed, depending on the exposure, can be also used as a printing plate. The reliefs which are obtained can be processed by suitable after-treatment to form either intaglio, litho or offset printing plates. Finally if the support of the copying layer is permeable to printing ink, as rice paper is, the support carrying the relief layer remaining on it can be used for screen printing.

By additional incorporation into the layer of compounds which can be transformed into dyes during or after the exposure and transfer at the temperature produced during exposure or a temperature which is higher, relief images are obtained which are dyed more strongly than the original layer in the same color or in another color.

As light source, there is used a photoflash tube, a so-called electronic flash, with a power of 300–5000 watt-seconds and a flash period of $10^{-4}$ to $10^{-2}$ seconds, which is preferably rod-shaped and which is arranged in the centre of a glass cylinder. Suitable exposure devices are described for instance in Belgian patent specification No. 664,668.

The process according to the present invention is also superior to those known processes in which relief images are produced by light cross-linking of light-sensitive polymeric layers. The materials used for these known processes contain light-sensitive layers which consist essentially of film-forming polymers that become insoluble or unswellable by themselves or in the presence of cross-linking agents under the action of light. The known materials have the disadvantage that special precautionary measures have to be taken because of their sensitivity during the processing.

In contrast to those known processes, the copying layers of the present invention are not light-sensitive in the usual sense. They can be used in daylight without difficulty. This results in a substantially more simple handling and a more convenient carrying out of the reproduction process.

EXAMPLE 1

Copying material 300 ml. of a 10% gelatin solution, which contains such a quantity of colloidal silver as grey pigment that the layer obtained after drying has an optical density of blue=0.6; green=0.37; and red=0.29, are mixed with 10 ml. of a 5% aqueous solution of saponin and 35 ml. of a 10% aqueous solution of polyacrolein bisulfite. The mixture is applied at a pH value of 6 onto a sheet of cellulose triacetate. The casting speed is 1.1 meters per minute at a casting temperature of 40° C. and the cast layer is dried at a temperature of 40–60° C. A brownish translucent layer is obtained.

Processing

A copying material having a size of 14.75 cm. by 21 cm. containing the above copying layer is brought with its copying layer side into contact with an original, and reflex-exposed by means of an electronic flash of 600 watt-seconds and $\frac{1}{2000}$ of a second from a distance of 40 mm. After the exposure, no image-wise change in the layer can be observed, but the previously brownish color of the layer as a whole has changed to a greenish layer. After moistening the exposed layer with water, the material is brought with its layer side into contact with an ordinary typewriting paper as reception sheet, guided through a squeegee device and immediately thereafter the materials are separated. A non-laterally reversed sharp relief image of the original is obtained on the paper. The exposed parts of the copying layer remain as a laterally reversed negative relief image on the cellulose triacetate support.

EXAMPLE 2

The process is performed as described in Example 1, but the polyacrolein bisulfite is replaced by 1 g. of cinnamaldehyde, which is incorporated by emulsification into the gelatin by means of a high-speed stirrer device. The gelatin preferably has added thereto 0.1 g. of ammonium acetate for stabilizing the pH value. After processing, a sharp transfer image is also obtained.

EXAMPLE 3

The process of Example 1 is followed, but using the gelatin solution with the grey pigment alone without the polyacrolein-bisulfite. After exposure, which must now, however, be performed with a substantially higher energy (about 1600 watt-seconds), the image portions of the layer which are not exposed and thus not cross-linked can be transferred to a paper in the manner indicated.

EXAMPLE 4

The procedure of Example 3 is followed, but the final copying layer is dipped into a solution of 15 g. of 1-p-sulfophenyl - 3,4 - dimethyl-4-(2-chlorophenyl-diazo)-1,2-pyrazolone-(5) in 220 ml. of water with addition of 15 ml. of a 5% aqueous solution of sodium diisobutyl-naphthalene-1-sulfonate, and again dried this time at 50–60° C. By comparison with Example 3, the energy required by the light exposure is substantially less. A visible image is obtained which consists of gas bubbles (whites) enclosed in the gelatin at the exposed areas. The unexposed areas remain unchanged. Concomitantly the gelatin is hardened by the pyrazolone cleavage products at the exposed areas, so that after moistening with the water in the manner indicated above, the unexposed parts of the image can be transferred to a reception paper sheet.

EXAMPLE 5

Copying material 50 ml. of a 5% solution of polyvinylpyrrolidone in methanol and containing 0.3 g. of colloidal black silver, are mixed with 50 ml. of a 5% solution of polyacrolein diethylacetal in methanol and cast at room temperature onto a support of cellulose triacetate. A homogeneous, greyish-brown layer is obtained with an optical density of 0.46 in white light.

Processing

On reflux exposure of a sheet of the above copying material having a size of 14.75 cm. by 21 cm. with an electronic flash light of about 750 watt-seconds from a distance of 4 cm., those surfaces of the layer which are adjacent to the whites of the original become yellowish in color and lose their solubility in methanol.

The copying material is now pressed with the layer side onto a reception paper moistened with methanol. The unexposed and thus unhardened portions of the layer which correspond to the characters of the original are swollen and transferred to the paper sheet. Upon separation those portions are torn out. A positive non-laterally reversed relief image of the original is obtained on the reception sheet.

EXAMPLE 6

The procedure indicated in Example 1 is followed, but 0.3 g. of hexamethylene diamine is added to the casting solution. The copying material is characterized by a higher sensitivity than that of Example 5. The processing is the same.

EXAMPLE 7

The procedure of Example 5 is followed, but the casting solution has added thereto the solution of 0.5 g. of copolymer of acrylamide and acrylamide-N-methylol-ethyl-ether in 10 ml. of methanol. The resulting copying material is characterized by a higher sensitivity than that of Example 5. The processing is the same as that indicated in Example 5.

EXAMPLE 8

Copying material 10 g. of polymethacrylamide-N-methylolbutyl ether are dissolved in a mixture of 80 ml. of acetone and 20 ml. of methanol. With the aid of a high-frequency spark-gap, colloidal bismuth is produced in this solution in a concentration of about 0.67 g/l. In 20 ml. of the bismuth-containing solution are dissolved 0.3 g. of 1-phenyl-3,4-dimethyl-4-(2-chlorophenyldiazo) - 1,2-pyrazolone-(5). The resulting mixture is applied to a transparent paper with a density of 0.1, so that a greyish-brown layer with a density of 0.36 to white light is obtained.

Processing

The copying material is subjected to reflex exposure and processed, as described in Example 5. A positive non-laterally reversed copy of the original is obtained.

EXAMPLE 9

Copying material 50 ml. of a 5% solution of polyvinylpyrrolidone in methanol containing 0.3 g. of colloidal black silver, are mixed with the solution of 5 g. of polymethacrylamide-N-methylolether in 50 ml. of methanol.

The above mixture is coated onto a transparent paper having an optical density of 0.1. The final layer has an optical density of 0.39 to white light.

Processing

The copying material is exposed and processed as in Example 5. A non-laterally reversed relief image of the original is obtained.

EXAMPLE 10

Copying material

A support of cellulose triacetate is coated in a ratio of 1 kg. per 20 m.² with the following dispersion: 600 ml. of a 10% aqueous solution of gelatin; 15 g. of tri-oxymethylene; 3 g. of a 50% aqueous dispersion of carbon black; 10 g. of a 30% aqueous dispersion of Siriuslichtblau FF 2 GL (C.I. 51,300); 50 ccm. of a 10% aqueous solution of saponine; and water is added to bring the volume up to 1000 ccm.

Processing

A sheet (14.75 cm. by 21 cm.) of the above copying material is contacted with the layer side against the original to be reproduced. The exposure is performed with a device described in Belgian Pat. No. 664,868 in such a manner that the support of the copying material is placed into contact with the glass cylinder. The rod-shaped electronic flash lamp had an intensity of 720 watt-seconds.

The exposed copying layer is moistened with water and further processed as described in Example 1. A positive non-laterally reversed relief image is obtained on the reception sheet. A laterally reversed negative relief image of the exposed portions of the original copying layer remains adhered on the cellulose triacetate support.

We claim:
1. A process of producing a relief copy of an original image that has portions which absorb light of the visible range of the spectrum on a visibly contrasting background which reflects light of the visible spectrum, said process comprising the steps of
   (a) exposing to the original by means of a flash of visible light with a power of 300–5000 watt-seconds for a period of $10^{-4}$ to $10^{-2}$ seconds, a copying material comprised of ingredients having wave radia- tion sensitivity limited to light power in the range of 300–5000 watt-seconds in a period of $10^{-4}$ to $10^{-2}$ seconds and having a support to which is adhered a layer of a swellable binder that is colored to absorb visible light with a power of 300–5000 watt-seconds for a period of $10^{-4}$ to $10^{-2}$ seconds and convert said light to heat energy, there being dispersed in said binder a hardening agent that reduces the swellability of the binder upon heating to a temperature between 50 and 300° C., the said flash power intensity being sufficient to effect such heating of the exposed areas of the copying layer,
(b) treating the exposed layer with a swelling liquid that swells the unexposed portions of the copying layer,
(c) pressing the thus treated copying layer against a reception sheet and then,
(d) separating the copying layer from the reception sheet to cause the softened portions of the copying layer to adhere to the reception sheet and be torn out of the copying layer, while the exposed and thus hardened portions of the copying layer remain adhered to the support of the copying layer.

2. A process as defined in claim 1 wherein gelatin is the binder.

3. A process as defined in claim 2 wherein the hardening agent is polyacrolein bisulfite, cinnamaldehyde, a glyoxal acetal or trioxymethylene.

4. A process as defined in claim 1, wherein the binder is a polymer of an N-methylol ether or ester of acrylamide or methacrylamide.

5. A process as defined in claim 1 wherein the binder is a polyacrolein acetal.

6. A process as defined in claim 1 wherein the copying layer has an optical density between 0.25 and 0.78.

References Cited

UNITED STATES PATENTS

| | | | |
|---|---|---|---|
| 3,181,462 | 5/1965 | Newman | 96—28X |
| 3,276,871 | 10/1966 | Abott | 96—35X |
| 3,295,969 | 1/1967 | Abott | 96—35X |
| 3,919,349 | 12/1959 | Kuhrmeyer et al. | 250—65:1 |
| 3,121,162 | 2/1964 | Roman et al. | 117—1.7X |
| 3,298,833 | 6/1967 | Gaynor | 96—75X |

DONALD LEVY, Primary Examiner

B. BETTIS, Assistant Examiner

U.S. Cl. X.R.

96—28, 44, 88, 49